Jan. 28, 1941.  S. STROMSTAD  2,230,018
COMBINE
Filed Nov. 22, 1938
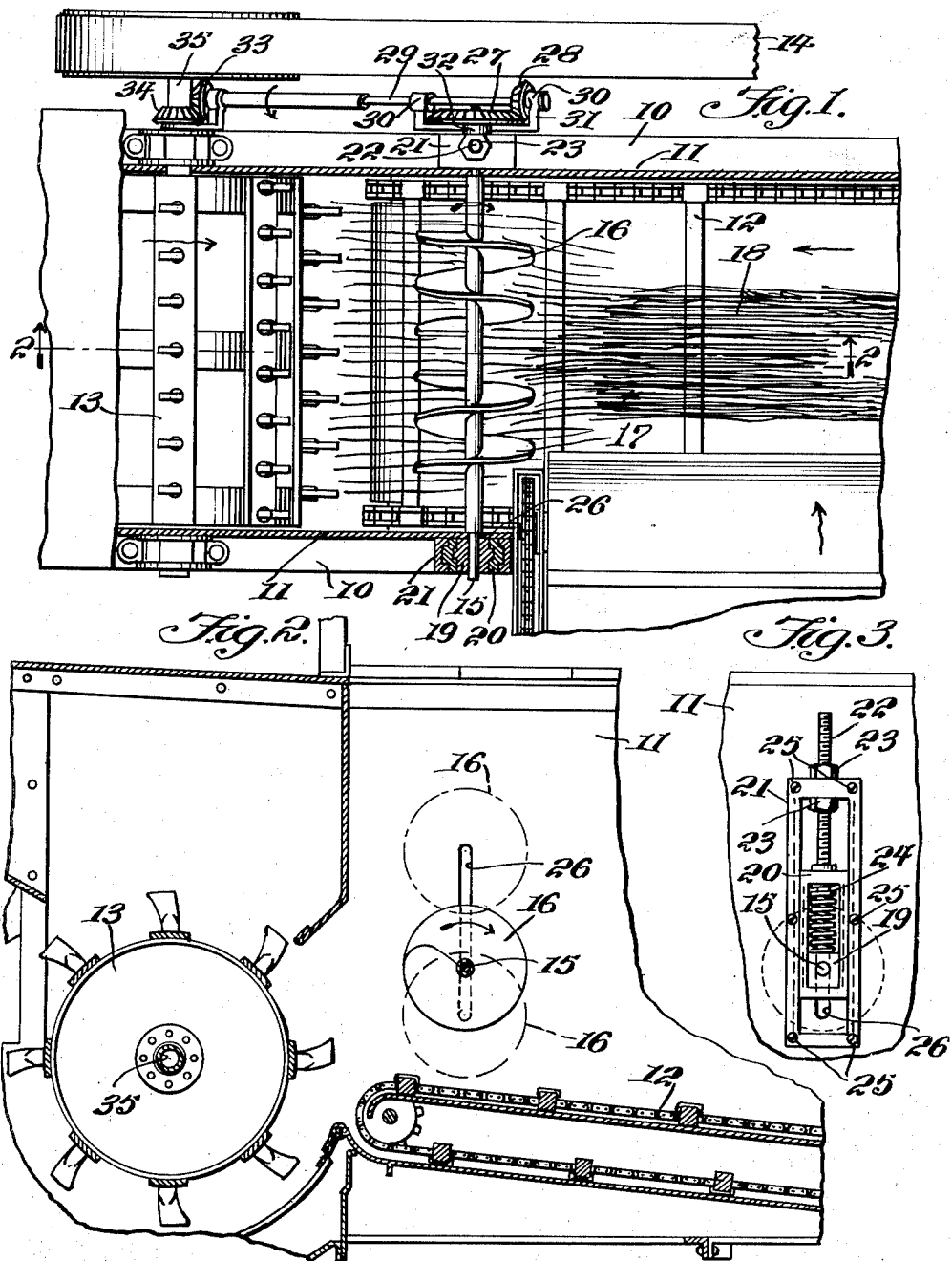
Seward Stromstad
INVENTOR
BY Victor J. Evans & Co.
ATTORNEYS
WITNESS J. T. L. Wright Patented Jan. 28, 1941

2,230,018

UNITED STATES PATENT OFFICE 2,230,018

COMBINE

Seward Stromstad, Shelly, Minn.

Application November 22, 1938, Serial No. 241,853

1 Claim. (Cl. 130—1)

This invention relates to a combine and has for an object to provide a spreader which will uniformly spread the swathe of cut grain toward the sides of the combine so as to be evenly distributed over the cylinder.

A further object is to provide a swathe spreader for combines adapted to be located at the delivery end of the conveyor and comprising a worm having a right hand and a left hand convolution the initial ends of which are above the center of the upper end of the conveyor so as to uniformly spread the swathe of cut grain laterally without altering the machine and without employing extraneous devices.

A further object is to provide a swathe spreader of this type which may be adjusted vertically to suit various conditions of service.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1 is a fragmentary longitudinal sectional view of a conventional combine showing a swathe spreader constructed in accordance with the invention applied thereto.

Figure 2 is a longitudinal sectional view taken on the line 2—2 of Figure 1.

Figure 3 is a side elevation of one of the adjustably mounted bearing devices for the shaft of the swathe spreader.

Referring now to the drawing in which like characters of reference designate similar parts in the various views, 10 designates the longitudinal sills, 11 the side walls, 12 the cut grain conveyor, 13 the cylinder, and 14 the belt drive for the cylinder, these parts being conventional in a combine.

In carrying out the invention, a shaft 15 is mounted transversely of the upper end of the conveyor and is provided with augers 16 and 17 having their initial ends spaced from each other at about the longitudinal center line of the conveyor, one of these augers being left hand and the other right hand so that the cut grain 18 traveling up the conveyor will be deflected laterally across the upper end of the conveyor and distributed uniformly across the entire length of the cylinder 13.

Each end of the shaft 15 is journaled in a respective block bearing 19 best shown in Figure 3, which is slidably mounted in the frame 20 which in turn is slidably mounted to be adjusted vertically in a frame 21. An adjusting screw 22 is swively mounted on the top of the frame 20 and is threadedly engaged through the top of the frame 21. Adjusting nuts 23 are mounted on the screw above and below the top of the frame 21 to hold the frame 20 in adjusted vertical positions for varying the height of the swathe spreader above the conveyor.

A helical spring 24 is confined under compression between the top of the frame 20 and the top of the bearing block 19, as also best shown in Figure 3. The bearing blocks at the ends of the shaft 15 may yield vertically against the tension of their respective springs 24 to permit the swathe spreader passing over irregularities in the cut grain traveling on the conveyor.

The guide frames 21 are mounted on the side walls 11 of the combine through the medium of screws 25 or other connectors and are preferably mounted on the outer faces of these walls. The ends of the shaft 15 project through respective slots 26 in the side walls, best shown in Figure 2, to permit vertical adjustment, and also vertical yielding of the shaft of the swathe spreader as above described.

For driving the swathe spreader one end of the shaft 15 is equipped with a bevel gear 27, best shown in Figure 1, which meshes with a pinion 28 carried by a shaft 29 which is journaled in bearings 30 formed on a bracket 31 which is secured to a lug 32 which projects from the adjacent adjustable frame 20. The shaft 29 is provided with a bevel gear 33 which meshes with a bevel gear 34 carried by the shaft 35 of the cylinder 13.

Since the operation of the parts has been described as the description of the parts progressed it is thought that the invention will be fully understood without further explanation.

What is claimed is:

In a combine, a conveyor, frames fixed to the sides of the combine at the discharge end of the conveyor, frames mounted for vertical adjustment in the first-named frames, adjusting screws connected to the top of the second-named frames and connected to the top of the first-named frames, nuts above and below the top of the first-named frames holding the second-named frames in adjusted vertical position, bearing blocks slidably mounted in the second-named frames, a shaft journaled in said bearing blocks and extending transversely across the conveyor, there being vertical slots in the sides of the conveyor through which said shaft projects, springs confined under compression between the bearing blocks and the upper ends of the second-named frames to normally cause the bearing blocks to abut against the lower ends of the second named frames and to permit the shaft to yield vertically, right and left augers on respective ends of the shaft having their initial ends disposed at the center of the shaft and adapted to uniformly spread loose cut grain laterally on the conveyor, and means on one projecting end of the shaft for driving the shaft.

SEWARD STROMSTAD.